유010410006B2

(12) United States Patent
Chanda et al.

(10) Patent No.: US 10,410,006 B2
(45) Date of Patent: Sep. 10, 2019

(54) METHOD AND APPARATUS FOR AUTOMATICALLY STORING AND APPLYING PERMISSIONS TO DOCUMENTS ATTACHED TO TEXT-BASED MESSAGES

(71) Applicant: BlackBerry Limited, Waterloo (CA)

(72) Inventors: Rupen Chanda, San Francisco, CA (US); Genevieve Elizabeth Mak, Toronto (CA); Pauline Po Ning Siu, Fremont, CA (US); Paul Wilson Lemarquand, Toronto (CA); Antti Juhani Piira, Sunnyvale, CA (US); Leonid Zolotarev, Toronto (CA)

(73) Assignee: BlackBerry Limited, Waterloo (CA)

( * ) Notice: Subject to any disclaimer, the term of this patent is extended or adjusted under 35 U.S.C. 154(b) by 35 days.

(21) Appl. No.: 15/237,477

(22) Filed: Aug. 15, 2016

(65) Prior Publication Data
US 2018/0046816 A1 Feb. 15, 2018

(51) Int. Cl.
*G06F 21/62* (2013.01)
*H04L 29/06* (2006.01)
*G06Q 10/10* (2012.01)
*H04L 12/58* (2006.01)

(52) U.S. Cl.
CPC ....... *G06F 21/6209* (2013.01); *G06Q 10/101* (2013.01); *G06Q 10/107* (2013.01); *H04L 63/0428* (2013.01); *H04L 51/08* (2013.01)

(58) Field of Classification Search
CPC .................................................. G06F 21/6209
See application file for complete search history.

(56) References Cited

U.S. PATENT DOCUMENTS

| 8,126,975 | B2 | 2/2012 | Hoyne et al. |
| 8,161,120 | B2 | 4/2012 | Tan |
| 8,185,930 | B2* | 5/2012 | Alperovitch ............ H04L 63/20 380/232 |
| 8,224,755 | B2 | 7/2012 | Goodman et al. |
| 8,875,030 | B1 | 10/2014 | Loverin et al. |
| 9,116,984 | B2* | 8/2015 | Caldwell ........... G06F 17/30719 |
| 2004/0268137 | A1* | 12/2004 | Kouznetsov ............ G06F 21/10 713/193 |
| 2006/0031309 | A1 | 2/2006 | Luoffo et al. |
| 2007/0028098 | A1 | 2/2007 | Baartman et al. |

(Continued)

OTHER PUBLICATIONS

European Patent Application No. 17184917.7, Extended European Search Report dated Oct. 30, 2017.

*Primary Examiner* — Kambiz Zand
*Assistant Examiner* — Thanh H Le
(74) *Attorney, Agent, or Firm* — Borden Ladner Gervais LLP; Todd Keeler

(57) ABSTRACT

A method and electronic device are provided to determine that a text-based message to be sent from a sender to a recipient includes a document attached thereto, determine a protection setting value associated with a protection setting, the protection setting value determined based on collaboration data associated with the sender and the recipient, determine whether the protection setting value meets a threshold, in response to determining that the protection setting value meets the threshold, apply the protection setting associated with the protection setting value to the document attached to the text-based message, and transmit the text-based message.

20 Claims, 5 Drawing Sheets

(56) References Cited

U.S. PATENT DOCUMENTS

| | | |
|---|---|---|
| 2007/0162587 A1 | 7/2007 | Lund et al. |
| 2008/0098237 A1* | 4/2008 | Dung ................ H04L 63/0428 713/189 |
| 2010/0306330 A1 | 12/2010 | Friedman et al. |
| 2012/0222132 A1 | 8/2012 | Burger et al. |
| 2013/0305316 A1* | 11/2013 | DeLuca ................ G06F 21/00 726/4 |
| 2015/0067833 A1* | 3/2015 | Verma ................ H04L 63/1483 726/22 |
| 2016/0043976 A1 | 2/2016 | Schultz et al. |
| 2016/0191472 A1 | 6/2016 | Ghafourifar |

* cited by examiner

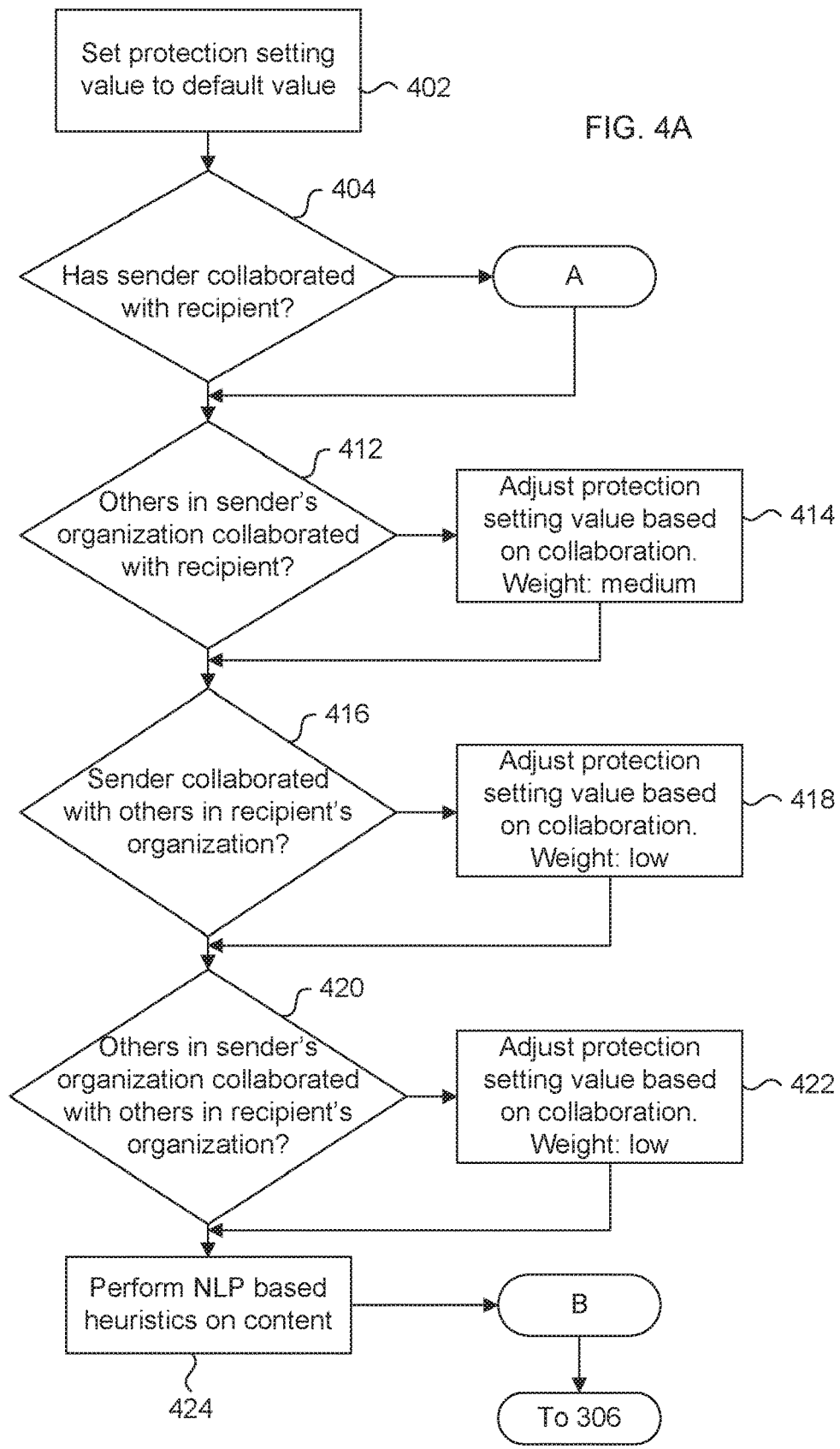

METHOD AND APPARATUS FOR AUTOMATICALLY STORING AND APPLYING PERMISSIONS TO DOCUMENTS ATTACHED TO TEXT-BASED MESSAGES

FIELD

The present disclosure relates generally to applying permissions to documents attached to text based messages.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth® capabilities.

Electronic devices may be utilized to share documents by, for example, attaching the document to an email or text message. However, when a document is sent by a sender, a sender may be unable to control who may access that document if, for example, the document is subsequently shared by the recipient or the original email or text message.

Improvements in electronic devices are desirable.

SUMMARY

One aspect of the disclosure provides a method for an electronic device that includes determining that a text-based message to be sent from a sender to a recipient includes a document attached thereto, determining a protection setting value associated with a protection setting, the protection setting value determined based on collaboration data associated with the sender and the recipient, determining whether the protection setting value meets a threshold, in response to determining that the protection setting value meets the threshold, applying the protection setting associated with the protection setting value to the document attached to the text-based message, and transmitting the text-based message.

In a further aspect, applying the protection setting includes automatically applying the protection setting in response to determining that the protection setting value meets the threshold.

In a further aspect, the collaboration data includes a previous protection setting value associated with a previous text-based message between the sender the recipient, the previous text-based message having a previous version of the document attached thereto.

In a further aspect, the collaboration data includes an average of previous protection setting values associated with previous text-based messages between the sender and the recipient.

In a further aspect, the collaboration data includes an average of previous protection setting values associated with previous text-based messages sent from the sender and to others at an organization associated with the recipient.

In a further aspect, the collaboration data includes an average of previous protection setting values associated with previous text-based messages sent to the recipient from others in an organization associated with the sender.

In a further aspect, the collaboration data includes a protection intent determined by performing natural language processing based heuristics analysis on the text-based message.

In a further aspect, applying the protection setting to the document includes removing the document from the text-based message, encrypting the document to generate an encrypted document, wherein encrypting applies the protection setting to the encrypted document, storing the encrypted document in a shared database, and performing one of including a link to the stored encrypted document in the text-based message, and attaching the encrypted document to the text-based message.

In a further aspect, the collaboration data is stored in a collaboration data database, the method including storing metadata associated with the text-based message to the collaborative data database as updated collaboration data, the metadata including the determined protection setting value.

In a further aspect, determining the protection setting value associated with the protection setting includes determining a plurality of protection setting values, each of the plurality of protection setting values associated with a respective one of a plurality of protection settings, applying the protection setting includes, for each of the plurality of protection setting values that meets a respective threshold, applying the ones of the plurality of protection settings associated with the plurality of protection setting values that meet the respective threshold, the method further comprising, prior to transmitting the text-based message determining whether the plurality of protection settings applied to the document meet a security threshold, and in response to determining that the plurality of protection settings applied to the document do not meet the security threshold, applying at least one additional protection setting such that the security threshold is met.

Another aspect of the present disclosure provides an electronic device for sending and receiving text-based messages, the electronic device including a processor configured to determine that a text-based message to be sent from a sender to a recipient includes a document attached thereto, determine a protection setting value associated with a protection setting, the protection setting value determined based on collaboration data associated with the sender and the recipient, determine whether the protection setting value meets a threshold, in response to determining that the protection setting value meets the threshold, apply the protection setting associated with the protection setting value to the document attached to the text-based message, and transmit the text-based message.

In another aspect, determining the protection setting value associated with the protection setting includes determining a plurality of protection setting values, each of the plurality of protection setting values associated with a respective one of a plurality of protection settings, applying the protection setting includes, for each of the plurality of protection setting values that meets a respective threshold, applying the ones of the plurality of protection settings associated with the plurality of protection setting values that meet the respective threshold, and the processor is further configured to, prior to transmitting the text-based message determine whether the plurality of protection settings applied to the document meet a security threshold, and in response to determining that the plurality of protection settings applied to the document do not meet the security threshold, apply at least one additional protection setting such that the security threshold is met.

In a further aspect, applying the protection setting includes automatically applying the protection setting in response to determining that the protection setting value meets the threshold.

In a further aspect, the collaboration data includes a previous protection setting value associated with a previous text-based message between the sender the recipient, the previous text-based message having a previous version of the document attached thereto.

In a further aspect, the collaboration data includes an average of previous protection setting values associated with previous text-based messages between the sender and the recipient.

In a further aspect, the collaboration data includes an average of previous protection setting values associated with previous text-based messages sent from the sender and to others at an organization associated with the recipient.

In a further aspect, the collaboration data includes an average of previous protection setting values associated with previous text-based messages sent to the recipient from others in an organization associated with the sender.

In a further aspect, the collaboration data includes a protection intent determined by performing natural language processing based heuristics analysis on the text-based message.

In a further aspect, applying the protection setting to the document includes removing the document from the text-based message, encrypting the document to generate an encrypted document, wherein encrypting applies the protection setting to the encrypted document, storing the encrypted document in a shared database, and performing one of including a link to the stored encrypted document in the text-based message, and attaching the encrypted document to the text-based message.

In a further aspect, the collaboration data is stored in a collaboration data database, the method including storing metadata associated with the text-based message to the collaborative data database as updated collaboration data, the metadata including the determined protection setting value.

BRIEF DESCRIPTION OF THE DRAWINGS

Embodiments of the present disclosure will now be described, by way of example only, with reference to the attached figures, in which.

DETAILED DESCRIPTION

Figure 1:
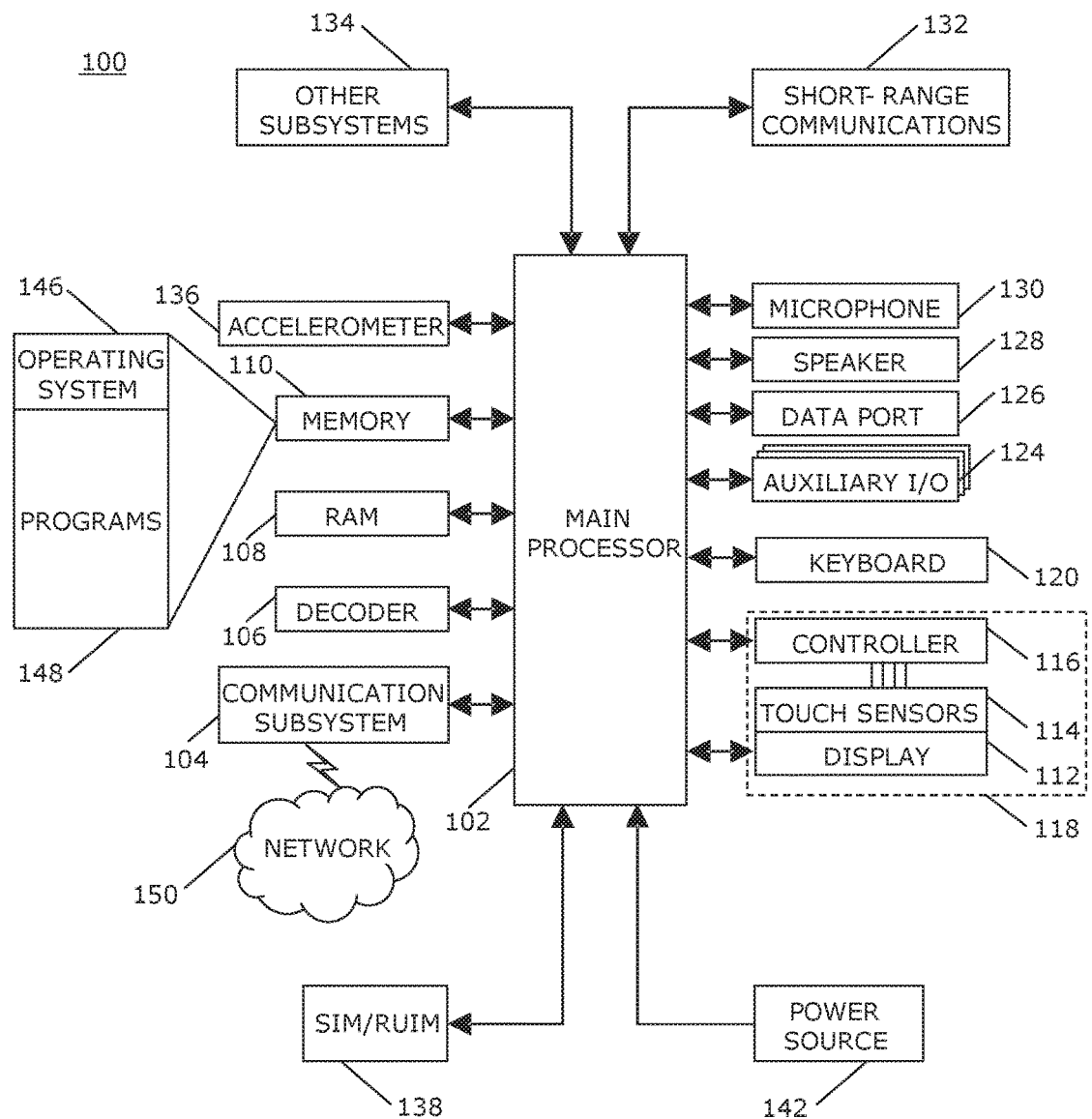
FIG. 1 is a block diagram of an example of a portable electronic device in accordance with the disclosure.

The following describes an electronic device and method for applying a permission setting to a document attached to a text-based message. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device as described herein. Examples of electronic devices include mobile, or handheld, wireless communication devices such as cellular phones, cellular smart-phones, wireless organizers, personal digital assistants, wirelessly enabled notebook computers, tablet computers, mobile internet devices, electronic navigation devices, and so forth. Other examples of electronic devices include devices that are not handheld devices or that may not be wireless communication devices such as desktop computers.

A block diagram of an example of an electronic device 100, which in the present example is a portable electronic device, is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a keyboard 120, an auxiliary input/output (I/O) subsystem 124, a data port 126, a speaker 128, a microphone 130, short-range communications 132 and other device subsystems 134. The speaker 128, also referred to as an earpiece speaker, is utilized to output audible signals when a user's ear is very close to the speaker 128. Although not shown, the processor may also interact with a loudspeaker, for example, for hands-free use. The keyboard 120 includes a plurality of keys, which may be mechanical keys that include mechanical switches or contacts for input to the electronic device 100 when a mechanical key of the keyboard is depressed by a sufficient amount to oppose a bias of the mechanical key. Alternatively, or in addition, the keys of the keyboard may include touch sensors coupled to a controller to detect touch input thereon.

The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

Figure 2:
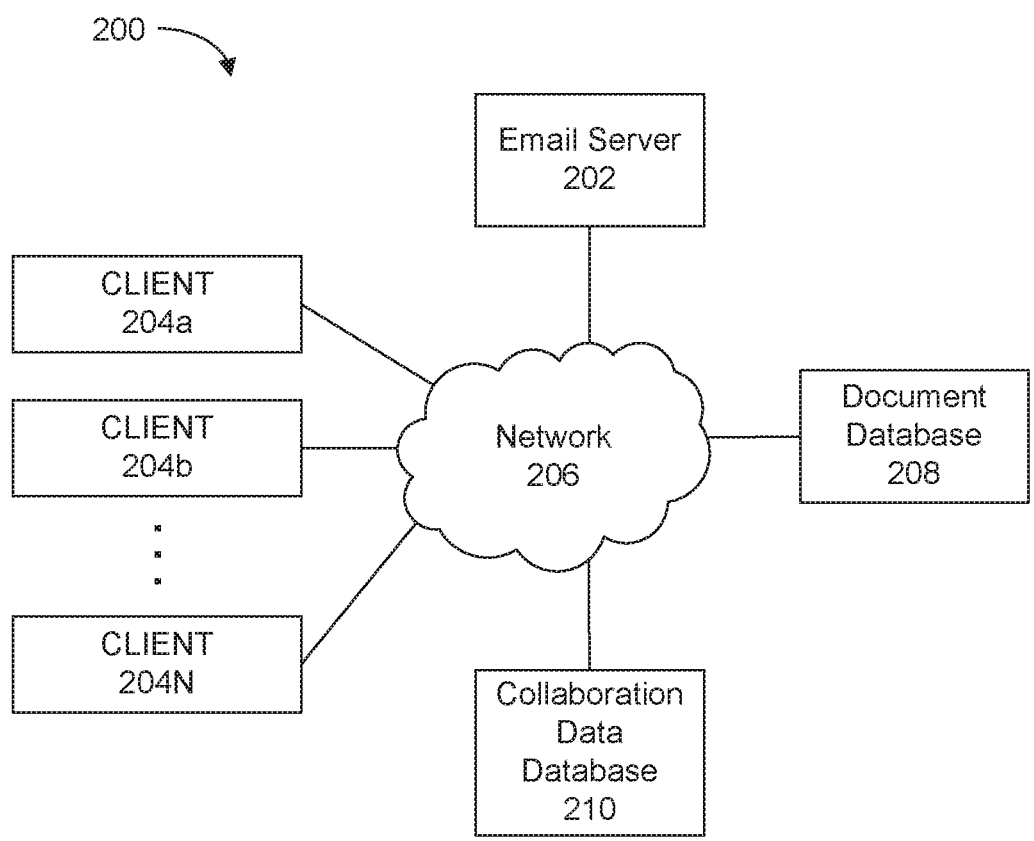
FIG. 2 is a block diagram of a system for sending text-based messages having documents attached in accordance with the disclosure.

In order for an electronic device 100 to send and receive text-based messages, the electronic device 100 communicates with a messaging server. A block diagram of an example system 200 for sending a text-based communication in accordance with the present disclosure is shown in FIG. 2.

The system 200 includes a messaging server 202 and one or more clients 204a-204N. The clients 204a-204N may each be, for example, electronic devices 100 described above with respect to FIG. 1. Each client 204a-204N communicates with the server 202 via the network 206. The network 206 may be any suitable type of communication network, including, for example, a local area network (LAN) connection, a wide area network (WAN) connection, an internet connection, a cellular connection, or any combination thereof. The network 206 may be wired, wireless, or a combination of wired and wireless. The system 200 also includes a document database 208 and a collaboration data database 210 connected to the network 206 to facilitate communication with the clients 204a-204N and the messaging server 202.

The document database 208 is a shared database of electronic documents that is accessible by the clients 204a-204N and the messaging server 202 via the network 206. "Documents", as the term is used herein, may refer to any type of electronic file including, for example, word processor files, spreadsheets, emails, instant messages, group chat messages, calendar data files such as for example scheduled calendar events, picture files, presentations, tasks, and program code.

The document database 208 may be, for example, a cloud-based document sharing service, or may form part of a collaborative workspace. A collaborative workspace is a network-based environment that enables multiple users to work in collaboration with one another. In general, a collaborative workspace may be associated with a particular project and multiple users of the collaborative workspace may be members of a team that is associated with the project. Documents and other materials, such as for example text documents, scheduled meeting data, tasks, and other electronic file associated with the project, may be stored in the collaborative workspace such that project members may access these documents via the network to review and edit the documents utilizing various tools that may be available within the collaborative workspace.

The documents stored in the document database 208 may each have an associated protection setting that may limit access to document. Protection settings may include, for example, various permissions that different users have with respect to the document. Examples of permissions include permissions to modify the document, to print to document, and to share the document.

The protection settings may be implemented by encryption of the documents stored in the document database 208. In an example, the protection settings of a document that are associated with a user, such as a recipient of the text-based message in which the document is attached, may be stored in a database such as, for example the document database 208. When a user attempts to access the document, or perform some other operation with respect of the document including modifying, saving, printing, and sharing the document, a determination is made, based on the stored protection setting for that user, whether the user has permission to perform the operation being attempted. If the user is determined to have permission to access the document, or perform the other operation with respect of the document, a decryption key is sent to the user such that the user is able to decrypt the encrypted document to facilitate the user accessing the document or performing the other desired operation. A viewer, such as a word processing program or any other suitable program for viewing the document, utilized by the user to access the document receives the decryption key as well as a policy file that sets out what functionality is allowed for the user. The viewer, based on the policy file, enforces the protection settings associated with the user when the user accesses the document.

The collaboration data database 210 is a database of information, such as, for example, metadata related to text-based messages that have been previously sent or received by, herein referred to as collaboration data. The collaboration data database 210 may include, for example, collaboration data related to all of the text-based messages sent or received by the messaging server 202. Alternatively, the collaboration data database 210 may include, for example, collaboration data related to text-based messages sent or received by certain users only, such as users associated with a particular organization. Each such previous text-based message may be referred to herein as a previous collaboration event. The collaboration data stored in the collaboration data database 210 may include personal information associated with the individuals who are the sender and the recipients of a previous collaboration event such as, for example, any or all of a name, an email address, an organization associated with the individual, and the like. A text-based message may be sent to multiple recipients and, in this case, the personal information stored as collaboration data may include the personal information for each of the recipients of the text-based message. The collaboration data stored in the collaboration data database 210 may also include information regarding any documents attached to a previously transmitted text-based message. A document may be considered to be "attached" to the text-based message if a copy of a document is included with the text-based message or if a link in the message to a copy of the document stored in a shared database such as the document database 208 is included in the text-based message. The collaborative data associated the attached document may include, for example, any or all of the document name, the contents of the document, the document version, protection settings or permissions, if any, applied to the document, and a protection setting value, if any, associated with each protection setting applied to the document. Protections setting values are described in more detail below.

Each time a text-based message is transmitted by the message server 202, the message server 202 may update the collaborative data database 210 with collaborative data associated with the text-based message. Alternatively, the clients 204a-204N may update the collaborative data database 210 each time a text-based message is transmitted or received at the client 204a-204N.

According to the present disclosure, the collaboration data stored in the collaboration data database 210 is utilized to predict and apply protection settings to a document attached to a text-based message prior to the message being transmitted to the recipients.

Figure 3:
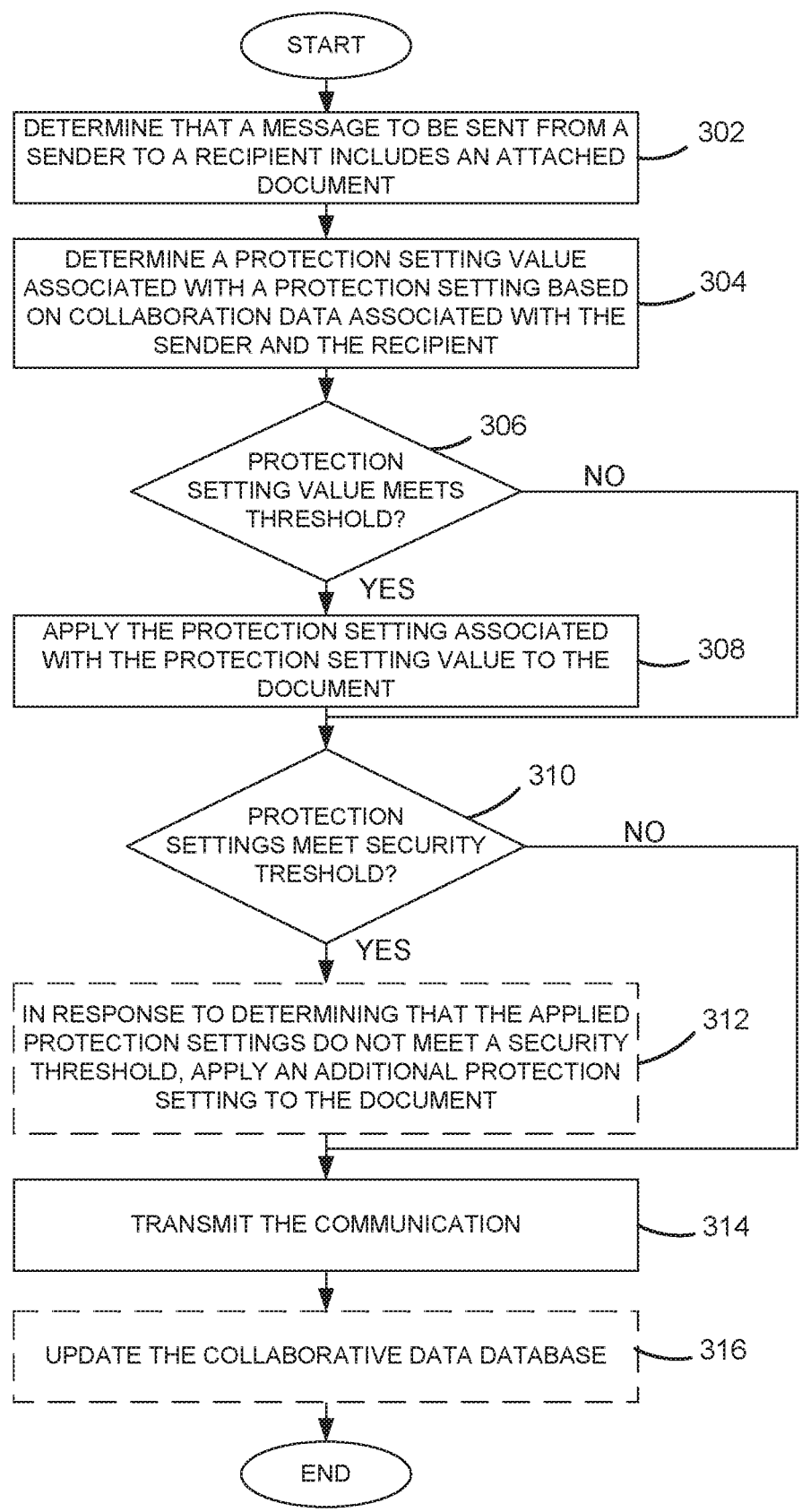
FIG. 3 is a flow chart illustrating a method of applying a protection setting to a document attached to a text-based method in accordance with the disclosure; and FIG. 4A through FIG. 4C is a flow chart illustrating an example method of determining a protection setting value in accordance with the flowchart of FIG. 3.

A flowchart illustrating a method for automatically determining and applying a permission setting for a document attached to a text-based message email to be transmitted is shown in FIG. 3. The method may be performed at, for example, the email server 202 that receives an email from one of the clients 204a-204N to be transmitted to a recipient. Alternatively, the method may be performed by the client 204a-204N at which the text-based message is sent from prior to transmitting the text-based message to the message server 202.

At 302, a determination is made that the text-based message to be sent from a sender to a recipient includes an attached document. In response to determining that the text-based message includes an attached document, a protection setting value associated with a protection setting is determined at 304. The determination at 304 is based on previous collaboration data. The previous collaboration data may be collaboration data stored in the collaboration data database 210. The previous collaboration data may be associated with the sender and the recipient. Different types of previous collaboration events may be associated with the sender and the recipient. The different types of previous collaboration events may include, for example, any of previous collaboration events between the sender and the recipient in which a document was attached, such as an earlier version of the current attached document or another document, previous collaboration events between another in the sender's organization and the recipient, previous collaboration events between the sender to others in the recipient's organization, previous collaboration events between others in the sender's organization and others in the recipient's organization.

The protection setting associated with the protection setting value may be a permission associated with the recipient's use of the document. Examples of protection settings include permissions to read only, read only in an online viewer, modify the document, print the document, save a new copy, and share the document.

As described in more detail below, the protection setting value may be, for example, a number or score that represents a the likelihood that the protection setting associated with the protection setting value should be applied to the document to be transmitted to the recipient. In an example, the protection setting value may vary within a range. For example, the protection setting value may vary between −100 and +100, with positive values indicating that applying the protection setting is likely to be desired based on the previous collaboration data, and negative values indicating that applying the protection setting is not likely to be desired base on the previous collaboration data.

In an example, the protection setting value may be determined by first setting the protection setting value to a default value, then adjusting the value up or down based on the previous collaboration data. The default value may be set to, for example, the middle of the range. For example, if the range of the protection setting value is −100 to +100, the default value may be set to 0. For example, if the protection setting associated with the protection setting value was generally applied to attached documents during previous collaboration events between the sender and the recipient, then the protection setting value may be increased from the default value, indicating a greater likelihood that the protection setting is intended to be applied to the current attached document. Conversely, if the protection setting associated with the protection setting value was generally not applied to attached documents during the previous collaboration events between the sender and the recipient, then the protection setting value may be decreased, indicating a greater likelihood that the protection setting in not intended to be applied to the currently attached document.

As described in more detail below, this adjusting of the protection setting value may be performed for each of several different types of previous collaboration events. The different types of previous collaboration events may be differently weighted such that some types result in a greater adjustment than other types. For example, the previous collaboration events between the sender and the recipient may be weighed higher, and therefore have a greater impact on the determined protection setting value, than previous collaboration events between, for example, the sender and others in the recipient's organization.

In an example, determining that protection setting value at 304 may include, for each type of previous collaboration event, adjusting the protection setting value based on an average of the protection setting values for the previous collaboration events of that type. The average protection setting value for a type of previous collaboration event may be a weighted average with more recent previous collaboration events weighted higher than older previous collaboration events. Adjusting the protection setting value based on the average protection setting values of different types of previous collaboration event may include differently weighting each average protection value such that types of previous collaboration events that are more relevant, such as previous collaboration events between the sender and recipient, are weighed higher than less relevant types, such as previous collaboration events between the sender and others in the recipient's organization, for example. Weighting may be provided by adjusting the protection setting value by a product of a weighting factor and the average protection setting. For example, the different types of previous collaboration events may be weighed as "very high", having a weighting factor of 1, "high" having a weighting factor of 0.7, "medium" having a weighting factor of 0.4, and "low" having a weighting factor of "0.2".

In an example of determining the protection setting value based on the previous collaboration data at 304, the protection setting value is initially set to a default protection setting value of 0, the weighted average of the previous collaboration events between the sender and recipient is +45 and a "high" weighting factor is applied to this type of type of previous collaboration event, corresponding to a weighting factor of 0.8. therefore, in this example, the default value is adjusted by (0.8)(+45)=36 such that the protection setting value after adjustment +36. If in this example, the next type of previous collaboration event is collaborations between others in the sender's organization and the recipient which has an average protection setting value of −75 and a "medium" weight corresponding to a weighting factor of 0.4. Therefore, the adjustment that is performed is (0.4)(−75)=(−30), and the protection setting value after this adjustment is 36+(−30)=+6.

In addition to utilizing previous collaboration data, determining the protection setting value at 304 may also be based on a natural language processing (NLP) based heuristics analysis of the content of the text-based message. The NPL analysis is utilized to determine, for example, an intention for an attached or linked document by searching for keywords such as, for example, "review", "revise", "print", and the like. For example, a prediction that the intended permission for the document is more likely to be "read and write" if the text based message includes the terms "revise" or "modify" compared a text-based message that includes the term "review" without the terms "revise" or "modify". NLP based heuristic analysis of a chain of text-based messages back and forth may be utilized to determine intended permission settings associated with an attached document. For example, if the document is attached to, or linked to, a text-based message sent in reply to a text-based message requesting the attached document "to print", then the NLP based heuristics analysis may determine that the intended permissions may be to "read only" with permission for the document to be printed.

At 306, the protection setting value is compared to a threshold to determine whether the determined protection setting value meets the threshold. The protection setting value may be determined to meet the threshold if, for example, the determined protections setting value is equal to or exceeds the threshold.

If the determined protection setting meets the threshold at 306, then the method continues to 308 and the protection setting associated with the determined protection setting value is applied to the document. Applying the protection setting may include causing a confirmation to be displayed on a display of a portable electronic device of the sender such that the sender can confirm that the sender desires that the protection setting be applied to the document. Alternatively, the protection setting may be applied automatically without confirmation from the sender.

The protection setting may be applied to the attached document by removing the attached document from the text-based message, storing the document to a shared document database 208, and encrypting the stored document to provide the protection setting as described previously. Once the document is removed, stored, and encrypted, the encrypted document may be reattached to the text-based message prior to transmission, or a link to the document stored in the document database 208 may be included in the text-based message.

If the determined protection setting does not to meet the threshold at 306, or after the protection setting is applied at 308, then the method optionally continues at 310 and a determination is made whether the protection settings applied to the document meet a security threshold. The security threshold may be a minimum set of required protection settings that an organization has determined a document must have applied to it before the document may be transmitted with a text-based message. The security threshold may be set by an administrator of the organization, or may be a default minimum. The security threshold may be determined, at least in part, by the recipient's organization such that different organizations may have different minimum levels of protection settings that are required. For example, a trusted organization may have a lower security threshold than an unknown organization. In another example, the security threshold for text-based messages sent internally within the organization may have no minimum set of required protection settings for attached documents. The security thresholds may also be different for different senders within an organization. For example, a member having access to the organizations confidential information may have a higher security threshold than another member who does not have access to confidential information.

If the protection settings applied to the document are determined not to meet the security threshold at the optional step 310, then the method continues to 312 and additional protection settings are applied to the document such that the applied protections settings meet the security threshold. In an example, the security threshold may be, for example, that any document sent to a particular "Company X" must have at least have a protection setting restricting modification of the document by members of Company X. In this example, if the determined protection setting value associated with the protections setting that restricts modification of the document does not meet the threshold, i.e., the protection setting restricting modification is not applied at 308, then the protection setting restricting modification is applied at 312 such that the documents meets the security threshold prior to being transmitted.

If the applied protection settings are determined to meet the security threshold at the optional step 310, or after the additional protections settings are applied at the optional step 312, the method continues to 314 and the text-based message is transmitted to the recipient. Optionally, at 316 the collaboration data database 210 is updated with collaboration data associated with the transmitted text-based message to be used to determine protection setting values for future attached documents. Updating the collaboration data database 210 may include stored metadata associated with the text-based message, including the protection settings applied to the attached document, as well as the results of any NPL analysis performed on the content of the text-based message.

In practice, multiple different protection settings may typically be applied to the attached document. In this case, each of the multiple different protection settings has an associated protection setting value that is determined at 304 and compared to an associated threshold at 306. The associated thresholds utilized at 306 may be different for different protection settings such that some protection settings have a higher threshold that must be met than other protections settings.

Figure 4B:
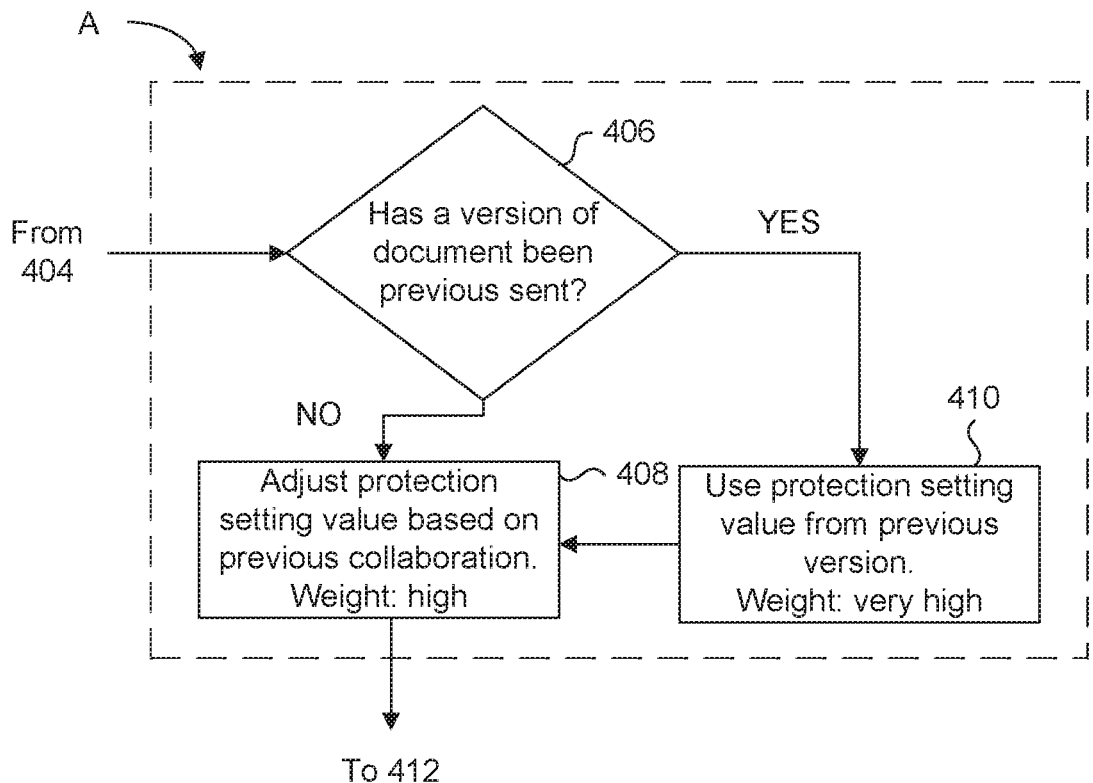
Figure 4C:
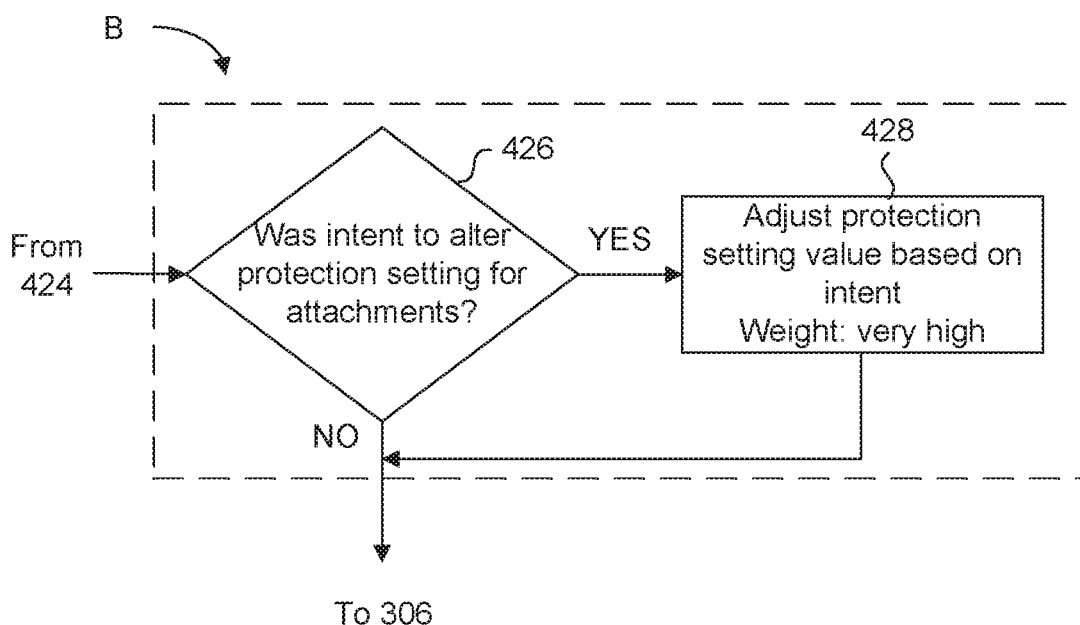

An example method for determining a protection setting value at 304 is shown in the flowchart in FIG. 4A through FIG. 4C. The example method shown in FIG. 4A to 4C illustrates one possible method for determining the protection setting based on previous collaboration data associated with different types of collaboration events, as described previously.

As described above, determining at 304 may include determining multiple protections setting values each associated with a respective protection setting. In this case, the example method shown in FIG. 4A through FIG. 4C may be performed for each of the protection setting values determined at 304.

At 402, the protection setting value is set to a default value. For example, the range of the possible values of the protection setting value may be −100 to +100, and the default value may be set to 0.

At 404, a determination is made whether the sender has previously collaborated with the recipient. The determination may be made by searching the collaboration data database 210 for previous collaboration events for which the sender and the recipient are included in the collaboration data. If the sender and recipient have previously collaborated, then the method continues at A, shown in FIG. 4B.

At A, a determination of whether a version of the same document currently attached to the text-based message was sent during a previous collaboration event is made at 406. If a version of the document is determined to have been previously sent in a previous collaboration event at 406, then the process proceeds to 408 and the protection setting value is set to the protection setting value from the previous collaboration event. The weight of this adjustment is "very high". In an example, a "very high" weight may be a multiplicity factor of 1. If multiple previous versions of the document have been sent in previous collaboration events between the sender and the recipient, then an average of the protection setting values for those previous collaboration events may be utilized for the adjustment at 408.

If a version of the same document was not previously sent, or after the protection setting value is set to the protection setting value of a previous collaboration event in which a version of the document was sent, the protection setting value is adjusted based on the previous collaboration events at 410. The adjustment at 410 may be based on an average of the protection setting values of the previous collaboration events between the sender and the recipient, which may be weighted average as described above. The adjustment performed at 410 is weighed "high".

After the adjusting at 410, a determination of whether others in the sender's organization have collaborated with the recipient is made at 412. If the determination at 412 is yes, then the protection setting value is adjusted at 414 based on the previous collaboration events in which others in the sender's organization have collaborated with the recipient. The adjustment at 412 may be based on an average of the protection setting values of the previous collaboration events between other's in the senders organization and the recipient, which may be weighted average as described above. The adjustment at 414 is weighted "medium", such that the adjustment at 414 will have less impact that the adjustments performed at 410 or 408.

If the determination at 412 is no, or after any adjustment at 414 is performed, a determination of whether the sender has previously collaborated with others at the sender's organization is performed at 416.

If the determination at 416 is yes, the protection setting value is adjusted at 418 based on the protection setting values of the previous collaboration events in which the sender collaborated with others in the sender's organization. The adjustment at 418 may be based on an average of the protection setting values of the previous collaboration events between the sender and other's in the recipient's organization, which may be weighted average as described above. The weighting applied to the adjustment at 418 is "low".

If the determination at 416 is no, or after any adjustment at 418 is performed, a determination of whether others in the sender's organization have previously collaborated with others in the recipient's organization is made at 420. If the determination at 420 is yes, the protection setting value is adjusted at 422 based on the protection setting values of the previous collaboration events in which others in the sender's organization collaborated with other's in the recipient's organization. The adjustment at 422 may be based on an average of the protection setting values of the previous collaboration events between others in the sender's organization and others in the recipient's organization, which may be weighted average as described above. The weighting applied to the adjustment at 422 is "low" indicating that this adjustment will have a low impact on the determined protection setting value.

If the determination at 420 is no, or after any adjustment at 422 is performed, the process proceeds to 424 and a NLP based heuristics analysis is performed on the content of the text-based message. After performing NPL based heuristics analysis on the content, the process continues to B shown in FIG. 4C.

In B, a determination is made at 426 whether based on the NLP based heuristics analysis, the content indicates an intention regarding applying the protection setting to the document. As disclosed above, this intent may be determined based on whether particular keywords or phrases are included in the content of the text-based message.

If the determination at 426 is yes, then the protection setting value is adjusted based on the intent at 428. For example, if a determination at 426 is that the content includes an intention that the protection setting should not be applied, then the protection setting value may be adjusted downward at 428 such that the determined protection setting value does not meet the threshold at 306. Similarly, if a determination at 426 is that the content includes an intention that the protection setting should be applied, then the protection setting value may be adjusted upward at 428 such that the determined protection setting value meets the threshold at 306. The weighting applied to the adjustment at 428 is set to "very high", indicating that any intention regarding the protection setting in the content of the text-based message will strongly influence the determined protection setting value.

The illustrative example shown in FIG. 4A through FIG. 4C is one method that the protection setting value may be determined at 304 and that other methods will be apparent to a person skilled in the art. For example, a fewer number of types of previous collaboration events may be utilized, or other types of previous collaboration events than those shown in the FIG. 4A through 4C, may be utilized. Further, the steps shown in FIG. 4A through FIG. 4C may be performed in a different order than shown. The weights associated with each step shown in FIG. 4A through 4C may be different. Additionally, rather than rather than utilizing an average of the protection setting values of the previous collaboration events for the adjustments at 408, 414, 418, 422 as described above, other adjustments based on the previous collaboration data may be utilized. For example, the protection setting value may be adjusted utilizing the protection setting value from the most recent previous collaboration event. In another example, the protection setting value may be adjusted up or down in a set amount associated with each type of previous collaboration event in response to determining that the protection setting associated with the protection setting value was generally applied or not applied during the previous collaboration events.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method for an electronic device comprising:
   determining that a text-based message to be sent from a sender to a recipient includes a document attached thereto;
   determining a protection setting value associated with the document attached to the text-based message, the protection setting value determined based on collaboration data associated with previous text-based messages associated with the sender and the recipient;
   determining whether the protection setting value meets a threshold;
   in response to determining that the protection setting value meets the threshold, applying a protection setting associated with the protection setting value to the document attached to the text-based message, wherein the protection setting applied to the document is a permission associated with the recipient's use of the document; and
   after applying the protection setting to the document, transmitting the text-based message.

2. The method according to claim 1, wherein applying the protection setting comprises automatically applying the protection setting in response to determining that the protection setting value meets the threshold.

3. The method according to claim 1, wherein the collaboration data includes a previous protection setting value associated with a previous document attached to a previous text-based message between the sender the recipient, wherein the previous document attached to the previous text-based message is a previous version of the document attached thereto.

4. The method according to claim 1, wherein the collaboration data includes an average of previous protection setting values associated with previous documents attached to pervious text-based messages between the sender and the recipient.

5. The method according to claim 1, wherein the collaboration data includes an average of previous protection setting values associated with previous documents attached to previous text-based messages sent from the sender and to others at an organization associated with the recipient.

6. The method according to claim 1, wherein the collaboration data includes an average of previous protection setting values associated with previous documents attached to previous text-based messages sent to the recipient from others in an organization associated with the sender.

7. The method according to claim 1, wherein the collaboration data includes a protection intent determined by performing natural language processing based heuristics analysis on the text-based message.

8. The method according to claim 1, wherein applying the protection setting to the document comprises, prior to transmitting the text-based message:
   removing the document from the text-based message;
   encrypting the document to generate an encrypted document, wherein encrypting applies the protection setting to the encrypted document;
   storing the encrypted document in a shared database; and
   performing one of:
      including a link to the stored encrypted document in the text-based message; and
      attaching the encrypted document to the text-based message.

9. The method according to claim 1, wherein the collaboration data is stored in a collaboration data database, the method further comprising storing metadata associated with the text-based message to the collaborative data database as updated collaboration data, the metadata including the determined protection setting value associated with the document.

10. The method according to claim 1, wherein:
    determining the protection setting value associated with the protection setting comprises determining a plurality of protection setting values, each of the plurality of protection setting values associated with a respective one of a plurality of protection settings;
    applying the protection setting comprises, for each of the plurality of protection setting values that meets a respective threshold, applying to the document attached to the text-based message the ones of the plurality of protection settings associated with the plurality of protection setting values that meet the respective threshold;

the method further comprising, prior to transmitting the text-based message:
- determining whether the plurality of protection settings applied to the document meet a security threshold; and
- in response to determining that the plurality of protection settings applied to the document do not meet the security threshold, applying at least one additional protection setting to the document such that the security threshold is met.

11. An electronic device for sending and receiving text based messages, the electronic device comprising a processor configured to:
- determine that a text-based message to be sent from a sender to a recipient includes a document attached thereto;
- determine a protection setting value associated with the document attached to the text-based message, the protection setting value determined based on collaboration data associated with previous text-based messages associated with the sender and the recipient;
- determine whether the protection setting value meets a threshold;
- in response to determining that the protection setting value meets the threshold, apply a protection setting associated with the protection setting value to the document attached to the text-based message, wherein the protection setting applied to the document is a permission associated with the recipient's use of the document; and
- after applying the protection setting to the document, transmit the text-based message.

12. The electronic device according to claim 11, wherein applying the protection setting comprises automatically applying the protection setting in response to determining that the protection setting value meets the threshold.

13. The electronic device according to claim 11, wherein the collaboration data includes a previous protection setting value associated with a previous document attached to a previous text-based message between the sender the recipient, wherein the previous document attached to the previous text-based message is a previous version of the document attached thereto.

14. The electronic device according to claim 11, wherein the collaboration data includes an average of previous protection setting values associated with previous documents attached to pervious text-based messages between the sender and the recipient.

15. The electronic device according to claim 11, wherein the collaboration data includes an average of previous protection setting values associated with previous documents attached to previous text-based messages sent from the sender and to others at an organization associated with the recipient.

16. The electronic device according to claim 11, wherein the collaboration data includes an average of previous protection setting values associated with previous documents attached to previous text-based messages sent to the recipient from others in an organization associated with the sender.

17. The electronic device according to claim 11, wherein the collaboration data includes a protection intent determined by performing natural language processing based heuristics analysis on the text-based message.

18. The electronic device according to claim 11, wherein applying the protection setting to the document comprises, prior to transmitting the text-based message:
- removing the document as an attachment from the text-based message;
- encrypting the document to generate an encrypted document, wherein encrypting applies the protection setting to the encrypted document;
- storing the encrypted document in a shared database; and
- performing one of:
  - including a link to the stored encrypted document in the text-based message; and
  - attaching the encrypted document to the text-based message.

19. The electronic device according to claim 11, wherein the collaboration data is stored in a collaboration data database in communication with the processor, and the processor is further configured to store metadata associated with the text-based message to the collaborative data database as updated collaborative data, the metadata including the determined protection setting value associated with the document.

20. The electronic device according to claim 11, wherein:
- determining the protection setting value associated with the protection setting comprises determining a plurality of protection setting values, each of the plurality of protection setting values associated with a respective one of a plurality of protection settings;
- applying the protection setting comprises, for each of the plurality of protection setting values that meets a respective threshold, applying to the document attached to the text-based message the ones of the plurality of protection settings associated with the plurality of protection setting values that meet the respective threshold; and
- the processor is further configured to, prior to transmitting the text-based message:
  - determine whether the plurality of protection settings applied to the document meet a security threshold; and
  - in response to determining that the plurality of protection settings applied to the document do not meet the security threshold, apply at least one additional protection setting to the document such that the security threshold is met.

* * * * *